US012270596B2

(12) United States Patent
Chang et al.

(10) Patent No.: US 12,270,596 B2
(45) Date of Patent: Apr. 8, 2025

(54) REFRIGERATOR

(71) Applicant: SAMSUNG ELECTRONICS CO., LTD., Suwon-si (KR)

(72) Inventors: Seyeun Chang, Suwon-si (KR); Myoungjin Jang, Suwon-si (KR); Eun Heo, Suwon-si (KR); Sungjin Park, Suwon-si (KR); Jisick Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 245 days.

(21) Appl. No.: 17/825,029

(22) Filed: May 26, 2022

(65) Prior Publication Data

US 2023/0039876 A1 Feb. 9, 2023

Related U.S. Application Data

(63) Continuation of application No. PCT/KR2022/006666, filed on May 10, 2022.

(30) Foreign Application Priority Data

Aug. 4, 2021 (KR) .................. 10-2021-0102802

(51) Int. Cl.
  *F25D 23/06* (2006.01)
(52) U.S. Cl.
  CPC .................. *F25D 23/062* (2013.01)
(58) Field of Classification Search
  CPC ........ F25D 23/062; F25D 11/02; F25D 23/02; F25D 23/12; F25D 23/028; F25D 23/025;
  (Continued)

(56) References Cited

U.S. PATENT DOCUMENTS

| 1,630,160 A | * | 5/1927 | Bayless | ............... F25D 23/025 |
| | | | | 312/291 |
| 2,051,733 A | * | 8/1936 | Moore | ............... F25D 23/025 |
| | | | | 312/316 |

(Continued)

FOREIGN PATENT DOCUMENTS

| CN | 105972924 A | * | 9/2016 | .......... F25D 23/028 |
| CN | 106568289 A | * | 4/2017 | |

(Continued)

OTHER PUBLICATIONS

International Search Report and Written Opinion of the International Searching Authority dated Sep. 1, 2022 for International Application No. PCT/KR2022/006666.

(Continued)

*Primary Examiner* — Hanh V Tran
(74) *Attorney, Agent, or Firm* — STAAS & HALSEY LLP

(57) ABSTRACT

A refrigerator with reduced material costs and improved productivity by forming a partition space inside a storage chamber in a simple structure. A refrigerator includes an outer case provided to form an external appearance, an inner case arranged at an inner side of the outer case to form a storage chamber, a partition provided to partition the inner case to form a partition space in the storage chamber, a cover provided to open or close the partition space, and a damper mounted on the partition to reduce an opening speed of the cover.

15 Claims, 14 Drawing Sheets

(58) Field of Classification Search
CPC ..... E05F 3/02; E05F 3/18; F16F 13/00; F16F 13/007; E05Y 2201/212; E05Y 2900/31
See application file for complete search history.

(56) References Cited

U.S. PATENT DOCUMENTS

| | | | | |
|---|---|---|---|---|
| 2,062,856 | A * | 12/1936 | Armbruster | F25D 23/025 160/237 |
| 2,124,857 | A * | 7/1938 | MacGrath | F25D 23/025 312/316 |
| 2,127,379 | A * | 8/1938 | Adams | F25D 23/025 312/297 |
| 2,470,956 | A * | 5/1949 | Savidge | F25D 23/025 62/517 |
| 4,225,203 | A * | 9/1980 | Goodrode | F25D 23/025 312/236 |
| 4,500,147 | A * | 2/1985 | Reister | F25D 23/025 312/328 |
| 5,458,412 | A | 10/1995 | Lee et al. | |
| 6,484,529 | B2 * | 11/2002 | Dasher | F25D 23/063 62/344 |
| 7,766,437 | B2 * | 8/2010 | Lim | F25D 25/024 312/330.1 |
| 9,644,885 | B1 * | 5/2017 | Johnson | F25D 23/067 |
| 10,088,224 | B1 * | 10/2018 | Platts | F25D 11/02 |
| 11,859,894 | B2 * | 1/2024 | Yu | F25D 1/00 |
| 2002/0083724 | A1 * | 7/2002 | Tarlow | F25D 17/042 62/131 |
| 2006/0213852 | A1 * | 9/2006 | Kwon | F25D 25/021 211/151 |
| 2007/0126325 | A1 | 6/2007 | Gorz et al. | |
| 2007/0228910 | A1 * | 10/2007 | Ertz | F25D 25/02 312/408 |
| 2009/0094789 | A1 * | 4/2009 | Bereznai | E05F 5/10 16/84 |
| 2009/0139259 | A1 * | 6/2009 | Kang | F25D 23/067 62/449 |
| 2009/0193836 | A1 * | 8/2009 | Ertz | F25D 25/025 62/449 |
| 2014/0015394 | A1 * | 1/2014 | Cha | F25D 11/02 312/404 |
| 2014/0252937 | A1 | 9/2014 | Lee et al. | |
| 2016/0108656 | A1 * | 4/2016 | Sugiura | E05F 1/1008 49/386 |
| 2016/0161174 | A1 * | 6/2016 | Yi | F25D 11/02 62/285 |
| 2018/0356145 | A1 * | 12/2018 | Candido | F25D 23/069 |
| 2019/0093940 | A1 * | 3/2019 | Besore | F25D 23/028 |
| 2020/0115945 | A1 * | 4/2020 | Akca | F16F 9/285 |
| 2021/0080167 | A1 * | 3/2021 | Kim | F25D 23/025 |

FOREIGN PATENT DOCUMENTS

| | | | | |
|---|---|---|---|---|
| CN | 209924709 | | 1/2020 | |
| DE | 3729597 | A1 * | 3/1989 | |
| DE | 102014106876 | A1 * | 11/2015 | E05D 7/081 |
| EP | 3546689 | A1 * | 10/2019 | E05B 47/0012 |
| EP | 3770538 | A1 * | 1/2021 | F25D 23/02 |
| JP | 2002119224 | A * | 4/2002 | A23L 1/0121 |
| KR | 0109848 | | 11/1996 | |
| KR | 20010108667 | A * | 12/2001 | |
| KR | 10-2007-0077344 | | 7/2007 | |
| KR | 10-0745792 | B1 | 8/2007 | |
| KR | 10-0751149 | B1 | 8/2007 | |
| KR | 100903906 | B1 * | 6/2009 | |
| KR | 20100122229 | A * | 11/2010 | |
| KR | 10-2011-0017680 | | 2/2011 | |
| KR | 10-1271961 | B1 | 6/2013 | |
| KR | 20150012618 | A * | 2/2015 | |
| KR | 10-1534156 | | 7/2015 | |
| KR | 10-2017-0133019 | | 12/2017 | |
| WO | WO-2008054115 | A1 * | 5/2008 | G25D 23/028 |
| WO | WO-2014001164 | A1 * | 1/2014 | A47L 15/4259 |
| WO | WO 2020/052519 | | 3/2020 | |

OTHER PUBLICATIONS

Office Action issued by the European Patent Office Aug. 7, 2024 for European Patent Application No. 22853232.1.

* cited by examiner

REFRIGERATOR

CROSS-REFERENCE TO RELATED APPLICATION

This application is a continuation application, under 35 U.S.C. § 111(a), of international application No. PCT/KR2022/006666, filed May 10, 2022, which is based on and claims priority under 35 U.S.C. § 119 to Korean Patent Application No. 10-2021-0102802, filed on Aug. 4, 2021 in the Korean Intellectual Property Office, the disclosure of which are incorporated herein by reference.

BACKGROUND

1. Field

The disclosure relates to a refrigerator having a partition space inside a storage chamber.

2. Description of the Related Art

A refrigerator is a home appliance that is equipped with a main body having a storage chamber and a cold air supply system for supplying the storage chamber with cold air to store food in a fresh state. The storage chamber includes a refrigerating chamber maintained at about 0° C. to 5° C. to store food refrigerated, and a freezing chamber maintained at about 0° C. to −30° C. to store food frozen.

The refrigerators may be classified into different types according to the positions of the refrigerating chamber and the freezing chamber and the shape of doors. The refrigerators may be classified into a Bottom Mounted Freezer (BMF)-type refrigerator in which a refrigerating chamber is formed at an upper side while a freezing chamber is formed at a lower side, a Top Mounted Freezer (TMF)-type refrigerator in which a refrigerating chamber is formed at a lower side while a freezing chamber is formed at an upper side, and a Side By Side (SBS)-type refrigerator in which a refrigerating chamber is formed at a left side while a freezing chamber is formed at a right side. In addition, the BMF type refrigerators may be classified into a French Door Refrigerator (FDR)-type refrigerator in which refrigerating chamber doors for opening and closing a refrigerating chamber are provided in a pair, and a four-door type refrigerator in which refrigerating chamber doors for opening and closing a refrigerating chamber are provided in a pair and freezing chamber doors for opening and closing a freezing chamber are provided in a pair.

The refrigerator may include a partition space provided inside the storage chamber that is formed to have an internal temperature different from that of the storage chamber. A user may store food in the storage chamber or the partition space according to the appropriate storage temperature of food.

SUMMARY

According to an aspect of the disclosure, there is provided a refrigerator including: an outer case provided to form an external appearance of the refrigerator; an inner case arranged at an interior of the outer case to form a storage chamber; a partition provided to partition the inner case and form a partition space within the storage chamber; a cover provided to open or close the partition space; and a damper mountable on the partition and configured to reduce an opening speed of the cover while mounted on the partition.

A lower side of the partition space may be formed by the partition; an upper side of the partition space, a rear side of the partition space, and opposite sides of the partition space may be formed by the inner case; and a front side of the partition space may be open.

The partition space may have an internal temperature lower than an internal temperature of the storage chamber.

The partition may include: a damper groove provided on a lower surface of the partition so that the damper is insertable into the damper groove; and a support protrusion formed to protrude from the damper groove and support the damper so that the damper is fixed to the damper groove.

The damper may include: a housing to be supported by the support protrusion and to be fixed to the damper groove; a damper cap provided to be in contact with the cover, and to be withdrawable from and insertable into the housing; and an elastic member arranged inside the housing and providing the damper cap with an elastic force as the damper cap is being withdrawn from the housing.

The damper may further include a friction ring coupleable to a ring groove formed on an outer circumferential surface of the damper cap, and when the damper cap is inserted into the housing, a force for the damper cap to be inserted into the housing may be increased by a friction force between the friction ring and the housing.

The housing may include an accommodating space provided to accommodate at least a portion of the damper cap, and when the damper cap is inserted into the housing, a force for the damper cap to be inserted into the housing may be increased by air in the accommodation space being compressed by the damper cap.

The refrigerator may further include a cover guide provided to guide movement of the cover and limit a movement range of the cover, wherein the cover may be rotatably coupleable to the cover guide.

The cover guide may include: a guide hole provided to guide movement of the cover when the cover rotates to open or close the partition space; and a shaft protrusion provided to form a rotation axis of the cover.

The cover may include: a plate provided to cover the open front side of the partition space when the cover closes the partition space; a shaft coupling portion to which the shaft protrusion is rotatably coupled; and a flange portion provided to pass through the guide hole according to rotation of the cover, the flange portion protruding rearward from the plate.

The cover may further include a cover stopper provided to be caught with the guide hole to limit an opening angle of the cover, the cover stopper provided on the flange portion.

The cover guide may further include a stopper support provided to support the cover by making contact with the cover stopper when the partition space is opened by the cover, and the stopper support may be arranged perpendicular to the partition.

The shaft coupling portion and the cover stopper are spaced apart in an upper side direction and a lower side direction when the partition space is opened by the cover.

The cover guide may further include a cover fixer configured to fix the cover to the cover guide, and keep the partition space closed by the cover, wherein the cover may further include a cover protrusion elastically coupled to the cover fixer so that the cover is fixed to the cover guide.

The cover fixer may be provided on one surface of the cover guide that faces a side surface of the inner case, and the cover protrusion may be coupleable to the cover fixer by passing through the guide hole.

According to an aspect of the disclosure, there is provided a refrigerator including: a refrigerator including: an outer case provided to form an external appearance; an inner case arranged at an inner side of the outer case to form a storage chamber; a partition provided to partition the inner case to form a partition space in the storage chamber; a cover provided to open or close the partition space; a cover guide provided to guide movement of the cover and limit a movement range of the cover; and a cover fixer to which the cover is elastically coupled, wherein the cover fixer fixes the cover to the cover guide to keep the partition space closed by the cover.

The cover guide may include a guide hole provided to guide movement of the cover when the cover rotates to open or close the partition space.

The cover may include a flange portion provided to pass through the guide hole according to rotation of the cover.

The cover may further include a cover stopper provided to be caught with the guide hole to limit an opening angle of the cover, the cover stopper provided on the flange portion.

The refrigerator may further include a damper mounted on a lower surface of the partition to reduce an opening speed of the cover.

The damper may include: a housing mounted on the lower surface of the partition; a damper cap provided to be in contact with the cover and withdrawn from or inserted into the housing; and an elastic member arranged inside the housing and providing the damper cap with an elastic force such that the damper cap moves in a direction of the damper cap being withdrawn from the housing.

The damper may further include a friction ring coupled to a ring groove formed on an outer circumferential surface of the damper cap.

When the damper cap is inserted into the housing, a force required for the damper cap to be inserted into the housing may be increased by a friction force between the friction ring and the housing.

BRIEF DESCRIPTION OF THE DRAWINGS

The above and other aspects, features, and advantages of certain embodiments of the present disclosure will become more apparent from the following description taken in conjunction with the accompanying drawings of which.

DETAILED DESCRIPTION

Figure 1:
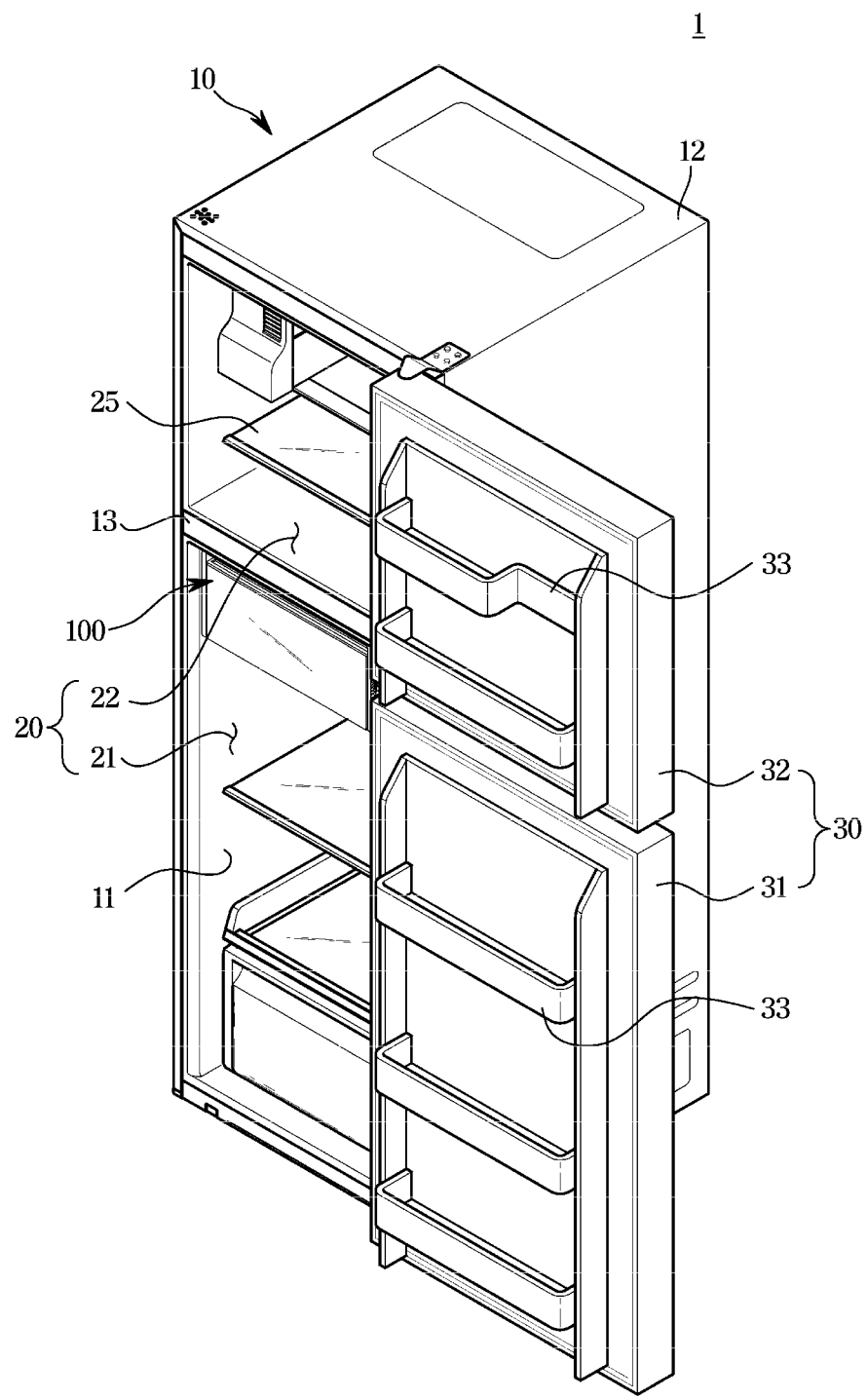
FIG. 1 is a view illustrating a refrigerator with a door open according to an embodiment of the disclosure, which shows a state in which a partition space is closed.

Embodiments described in the specification and configurations shown in the accompanying drawings are merely exemplary examples of the disclosure, and various modifications may replace the embodiments and the drawings of the disclosure at the time of filing of the application.

Further, identical symbols or numbers in the drawings of the disclosure denote components or elements configured to perform substantially identical functions.

Further, terms used herein are only for the purpose of describing particular embodiments and are not intended to limit to the disclosure. The singular form is intended to include the plural form as well, unless the context clearly indicates otherwise. It should be further understood that the terms "include," "including," "have," and/or "having" specify the presence of stated features, integers, steps, operations, elements, components, and/or groups thereof, but do not preclude the presence or addition of one or more other features, integers, steps, operations, elements, components, and/or groups thereof.

Further, it should be understood that, although the terms "first," "second," etc. may be used herein to describe various elements, the elements are not limited by the terms, and the terms are only used to distinguish one element from another. For example, a first element could be termed a second element, and similarly, a second element could be termed a first element without departing from the scope of the disclosure. The term "and/or" includes combinations of one or all of a plurality of associated listed items.

The terms "front", "rear", "left", "right", and the like as herein used are defined with respect to the drawings, but the terms may not restrict the shape and position of the respective components.

Therefore, it is an object of the disclosure to provide a refrigerator including a partition space inside a storage chamber that is formed to have an internal temperature different from an internal temperature of the storage chamber.

It is another object of the disclosure to provide a refrigerator with reduced material costs and improved productivity by forming a partition space inside a storage chamber in a simple structure.

It is another object of the disclosure to provide a refrigerator with improved user convenience and structural stability of a door for opening and closing a partition space inside a storage chamber, by reducing the opening speed of the door when opening the door.

The technical objectives of the disclosure are not limited to the above, and other objectives may become apparent to those of ordinary skill in the art based on the following descriptions.

Hereinafter, an embodiment according to the disclosure will be described in detail with reference to the accompanying drawings.

Figure 2:
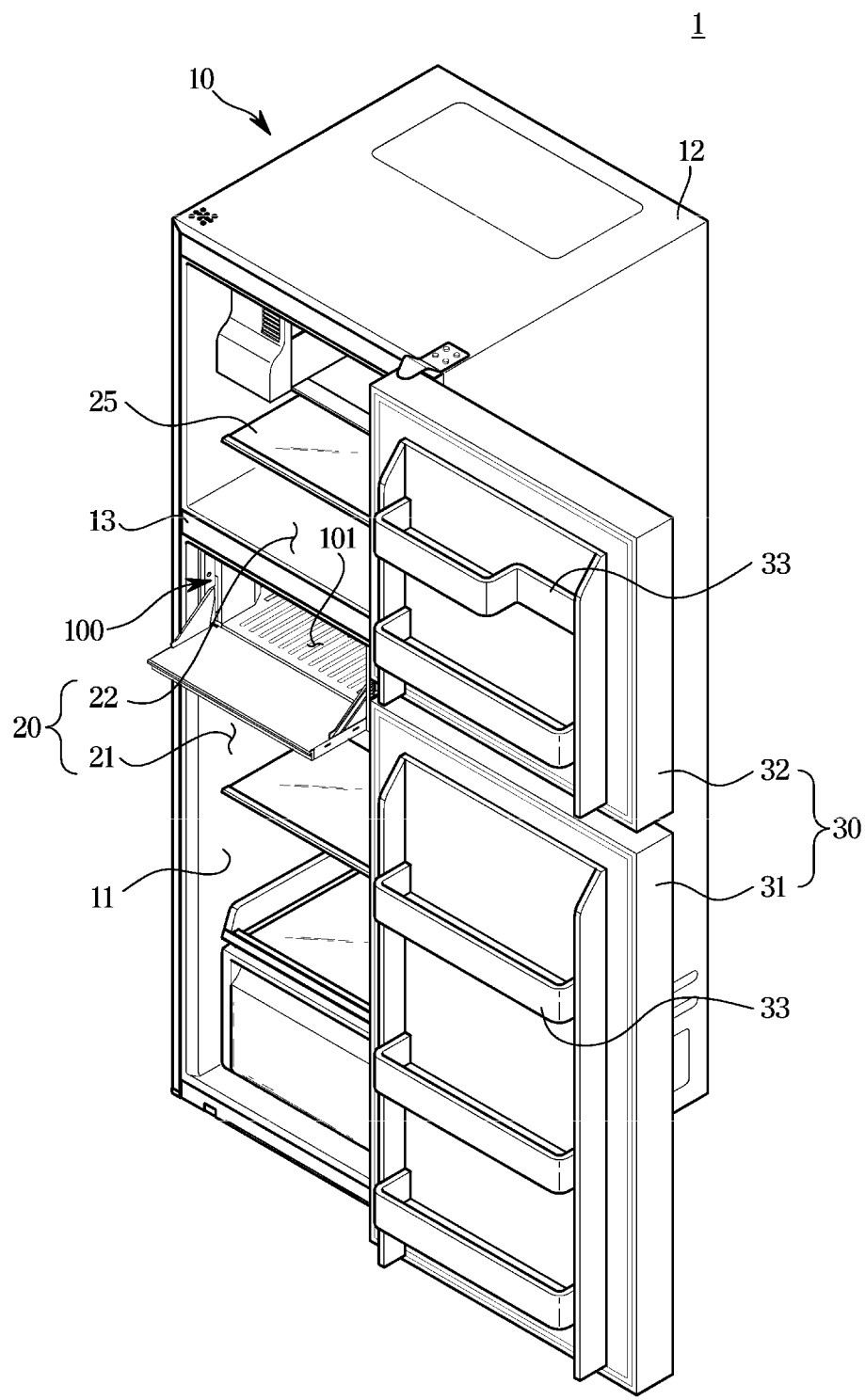
FIG. 2 is a view illustrating a state in which the partition space is open, in the refrigerator shown in FIG. 1.

FIG. 1 is a view illustrating a refrigerator with a door open according to an embodiment of the disclosure, which shows a state in which a partition space is closed. FIG. 2 is a view illustrating a state in which the partition space is open, in the refrigerator shown in FIG. 1.

A refrigerator 1 includes a main body 10, a storage chamber 20 provided inside the main body 10 to have a front that is openable, and doors 30 rotatably coupled to the main body to open and close the open front of the storage chamber 20.

The main body 10 includes an inner case 11 forming the storage chamber 20, an outer case 12 arranged on an outer side of the inner case to form the external appearance, and a cold air supply device (not shown) for supplying cold air to the storage chamber 20.

The cold air supply device may include a compressor, a condenser, an expansion valve, an evaporator, a fan, a cold air duct, and the like, and an insulator (not shown) is foamed between the inner case 11 and the outer case 12 of the main body 10 to prevent outflow of cold air of the storage chamber 20.

The storage chamber 20 may include a refrigerating chamber 21 and a freezing chamber 22 divided by a partition wall 13. According to the embodiment of the disclosure, the refrigerating chamber 21 may be arranged on a lower side, and the freezing chamber 22 may be arranged on an upper side. However, the disclosure is not limited thereto, and the refrigerating chamber may be arranged on an upper side and the freezing chamber may be arranged on a lower side, or the refrigerating chamber and the freezing chamber may be arranged side by side.

The storage chamber 20 may include a shelf 25. The shelf 25 may be arranged inside the storage chamber 20 to divide the interior of the storage chamber 20 into a plurality of zones. The storage chamber 20 may include a plurality of shelves 25.

The refrigerator 1 may include doors 30 rotatably coupled to the main body 10. The doors 30 may include a refrigerating chamber door 31 rotatably coupled to the main body 10 to open and close the refrigerating chamber 21 and a freezing chamber door 32 rotatably coupled to the main body 10 to open and close the freezing chamber 22. A door guard 33 capable of accommodating food or the like may be provided on a rear surface of the door 30.

According to the aspect of the disclosure, the refrigerator 1 may include a partition device 100 (also referred to as partition 100) provided inside the storage chamber 20.

The partition device 100 may form a partition space 101 inside the storage chamber 20 such that the partition space 101 is separated from the storage chamber 20. According to the embodiment of the disclosure, the partition device 100 may be provided in the refrigerating chamber 21.

Referring to FIGS. 1 and 2, the partition device 100 may be arranged on an upper side of the refrigerating chamber 21. The partition device 100 may form the partition space 101 separated from the refrigerating chamber 21 inside the refrigerating chamber 21, and may be provided to open and close the partition space 101. The internal temperature of the partition device 100 may be set to be different from the internal temperature of the refrigerating chamber 21. For example, the internal temperature of the partition device 100 may be set to be lower than the internal temperature of the refrigerating chamber 21. In other words, the temperature of the partition space 101 may be kept lower than the internal temperature of the refrigerating chamber 21. A user may store food in the refrigerating chamber 21 or in the partition device 100 according to the appropriate storage temperature of the food.

In the following description, the refrigerating chamber 21 is referred to as a storage chamber 21 for the sake of convenience in description.

Figure 3:
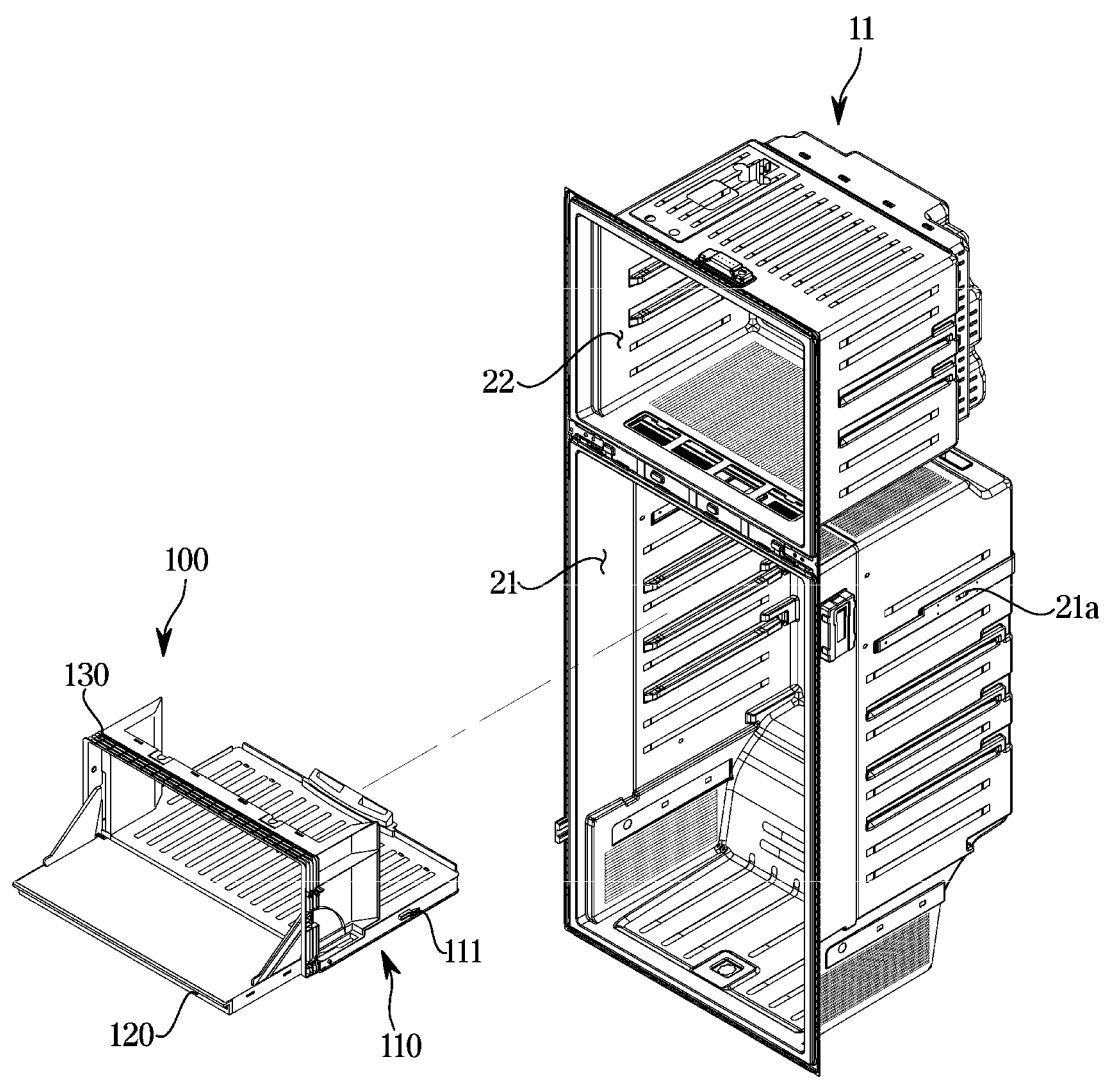
FIG. 3 is a view illustrating an inner case and a partition device separated from the inner case, in the refrigerator according to the embodiment of the disclosure.

FIG. 3 is a view illustrating the inner case and the partition device separated from the inner case, in the refrigerator according to the embodiment of the disclosure.

Referring to FIG. 3, the partition device 100 may include a partition 110 coupled to the inner case 11 to partition the refrigerating chamber 21, a cover 120 that opens and closes a front side of the partition space (101 in FIG. 2), and a cover guide 130 coupled to the partition 110 and the inner case 11 to guide a movement of the cover 120.

The partition device 100 may be coupled to the inner case 11. The partition device 100 may partition the inner case 11 to form the partition space (101 in FIG. 2) inside the storage chamber 21 that is formed by the inner case 11. More specifically, the partition 110 may be coupled to the inner case 11 to partition the storage chamber 21, and a space divided by the partition 110 may form the partition space 101.

According to the aspect of the disclosure, a lower side of the partition space 101 may be formed by the partition 110, and opposite sides, an upper side, and a rear side of the partition space 101 may be formed by the inner case 11. In addition, a front side of the partition space 101 may be open, and the open front side of the partition space 101 may be opened and closed by the cover 120.

According to the aspect of the disclosure, the upper side, the rear side, and the opposite sides of the partition space 101 are formed by the inner case 11 except for the lower side of the partition space 101, and thus the partition space 101 may be formed inside the storage chamber 21 only using the partition 110.

In order to form a partition space having an internal temperature different from that of the storage chamber, all sides forming the partition space may be formed using as partition walls in which an insulator is provided. In this manner, heat exchange between the inside of the storage chamber and the partition space may be blocked. In the related art, a heat insulator is included in the partition wall forming the remaining sides except for the one open side of the partition space. To this end, a plurality of partition walls having a heat insulator inside need to be manufactured, and because the partition wall having a heat insulator inside has a high manufacturing cost and a long production time, the productivity of the refrigerator is lowered.

According to the aspect of the disclosure, the partition space 101 may be formed inside the storage chamber 21 only using the partition 110 in which a thermal insulator (not shown) is foamed. Because the upper side, the rear side, and the opposite sides of the partition space 101 are formed by the inner case 11, and the insulator (not shown) is foamed between the inner case 11 and the outer case 12 as described above, all sides of the partition space 101 except for the open front side may be provided with an insulator. Accordingly, heat exchange between the inside of the storage chamber 21 and the partition space 101 may be effectively blocked. In addition, the partition 110 in which the insulator is arranged only on the lower side of the partition space 101, and thus the material cost of the refrigerator may be reduced and productivity may be improved.

Figure 4:
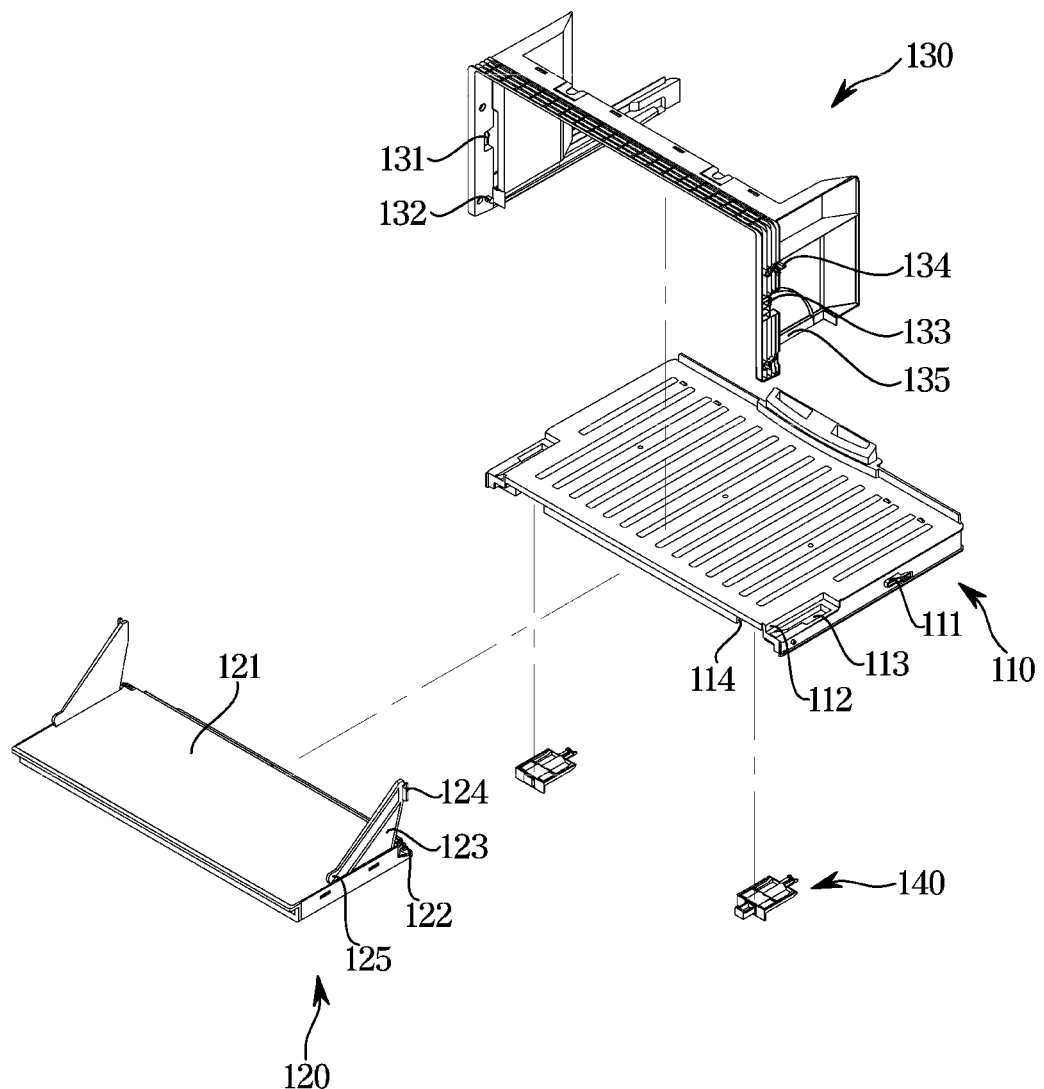
FIG. 4 is an exploded view illustrating the partition device in the refrigerator according to the embodiment of the disclosure.

FIG. 4 is an exploded view illustrating the partition device in the refrigerator according to the embodiment of the disclosure.

Referring to FIG. 4, the partition device 100 according to the embodiment of the disclosure may include the partition 110, the cover 120, the cover guide 130, and a damper 140.

The partition 110 may include an insulator (not shown) therein. The partition 110 may be coupled to the inner case 11 to form a partition space inside the storage chamber 21. The partition 110 may include a coupling protrusion 111 provided to be inserted into a coupling hole 21*a* formed in the inner case 11. The coupling protrusions 111 may protrude laterally from opposite sides of the partition 110.

The partition 110 may include a rib insertion groove 112 into which a coupling rib 135 of the cover guide 130 to be described below is inserted, and a cover insertion groove 113 into which a portion of a cover stopper 124 and a portion of a flange portion 123 of the cover 120 to be described below are inserted. The rib insertion grooves 112 may be formed by recessing portions of opposite side front ends of the partition 110. The cover insertion groove 113 may be formed by recessing a portion of the rib insertion groove 112.

The partition 110 may include a damper groove 114 into which the damper 140 to be described below is inserted, and a support protrusion (115 in FIG. 9) for supporting the damper 140 such that the damper 140 is fixed inside the damper groove 114.

The cover 120 may be provided to open and close the partition space (101 in FIG. 2). The cover 120 may be rotatably coupled to the cover guide 130. The cover 120 may include a plate portion 121 provided to cover the open front side of the partition space 101, a shaft coupling portion 122 provided to allow a shaft protrusion 132 of the cover guide 130 to be inserted thereinto, a flange portion 123 extending rearward from the plate portion 121, a cover stopper 124 provided at one end of the flange portion 123, and a cover protrusion 125 provided at the other end of the flange portion 123.

According to the embodiment of the disclosure, the plate portion 121 may be formed of a transparent material. The plate portion 121 may be composed of a pair of transparent members spaced apart from each other.

The shaft coupling portion 122 may allow the shaft protrusion 132 to be rotatably coupled thereto. In other words, the shaft coupling portion 122 may be coupled to be rotatably with respect to the shaft protrusion 132. According to the embodiment of the disclosure, the shaft protrusion 132 may be fixed, and the shaft coupling portion 122 may rotate with respect to the shaft protrusion 132 such that the cover 120 may rotate with respect to the cover guide 130.

The flange portions 123 may be formed to protrude rearward from opposite side ends of the plate portion 121. The flange portion 123 may be provided at one end thereof with the cover stopper 124, and at the other end thereof with the cover protrusion 125. The cover stopper 124 may be provided to limit the opening angle of the cover 120. The cover protrusion 125 may be provided to be coupled to a cover fixer 134 to be described below. As the cover protrusion 125 is coupled to the cover fixer 134, the partition space 101 is kept closed by the cover 120.

The cover guide 130 may be provided to guide the movement of the cover 120 and limit the movement range of the cover 120. The cover guide 130 may be coupled to the inner case 11. The cover guide 130 may be supported by the partition 110.

The cover guide 130 may include the shaft protrusion 132 coupled to the shaft coupling portion 122 of the cover 120 and serving as a rotation axis of the cover 120. The shaft protrusion 132 may be provided to perform a relative rotation in the shaft coupling portion 122. As described above, the shaft protrusion 132 may be fixed, and the shaft coupling portion 122 may rotate relative to the shaft protrusion 122.

The cover guide 130 may include a guide hole 131 provided to guide the movement of the cover 120 when the cover 120 rotates to open or close the partition space 101. The guide hole 131 may guide the movement of the cover 120 by guiding the flange portion 123 that passes through the guide hole 131 during movement of the cover 120. The guide hole 131 is provided to have a width smaller than that of the cover stopper 124, to thereby limit the opening angle or movement range of the cover 120. In addition, the cover guide 130 may be coupled to the partition 110 to form an opening smaller than the plate portion 121. The opening may refer to the open front side of the partition space 101. Because the opening is provided to be smaller than the plate portion 121, the cover 120 does not pass through the opening and thus the movement range of the cover 120 may be limited.

The cover guide 130 may include a stopper support 133 that comes in contact with the cover stopper 124 to limit the opening angle of the cover 120. The cover guide 130 may include the cover fixer 134 that is coupled to the cover protrusion 125 to keep the partition space 101 closed by the cover 120. In addition, the cover guide 130 may include the coupling rib 135 provided to be inserted into the rib insertion groove 112 of the partition 110. The coupling rib 135 may be provided to correspond to the rib insertion groove 112 so as to be inserted into the rib insertion groove 112. As the coupling rib 135 is inserted into the rib insertion groove 112, the cover guide 130 may be supported by the partition 110.

The damper 140 may be coupled to a lower surface of the partition 110. The damper 140 may be provided to come in contact the cover 120 when the cover 120 is being opened to reduce the opening speed of the cover 120. Details of the damper 140 will be described below.

Figure 5:
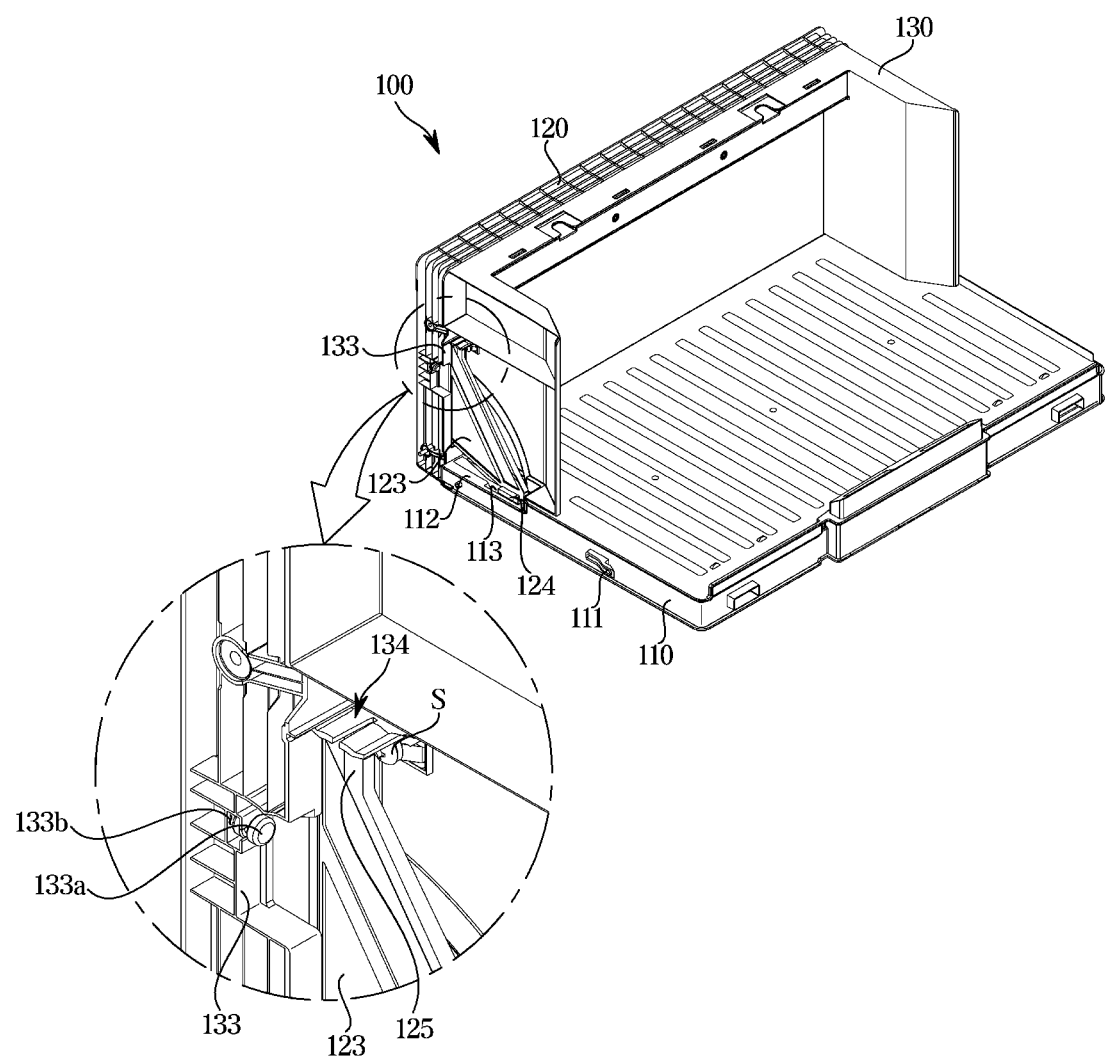
FIG. 5 is a view separately illustrating the partition device with a cover closed, in the refrigerator according to the embodiment of the disclosure.
Figure 6:
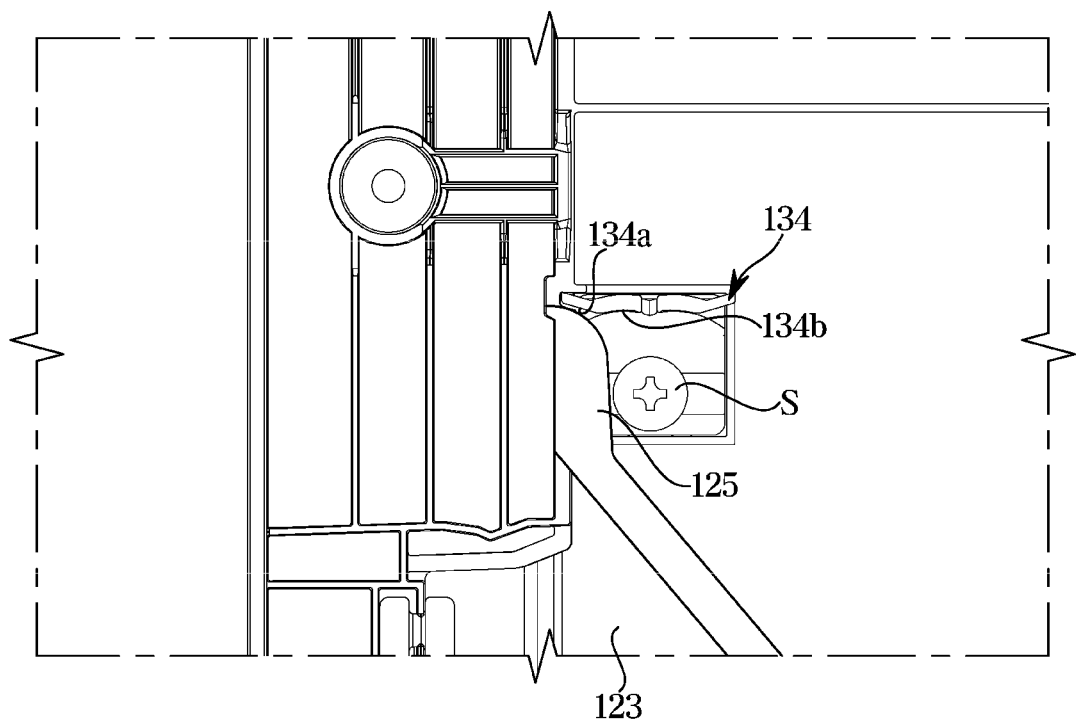
FIG. 6 is a view illustrating a process of closing the cover of the partition device in the refrigerator according to the embodiment of the disclosure, which shows a state before a cover protrusion is coupled to a cover fixer.
Figure 7:
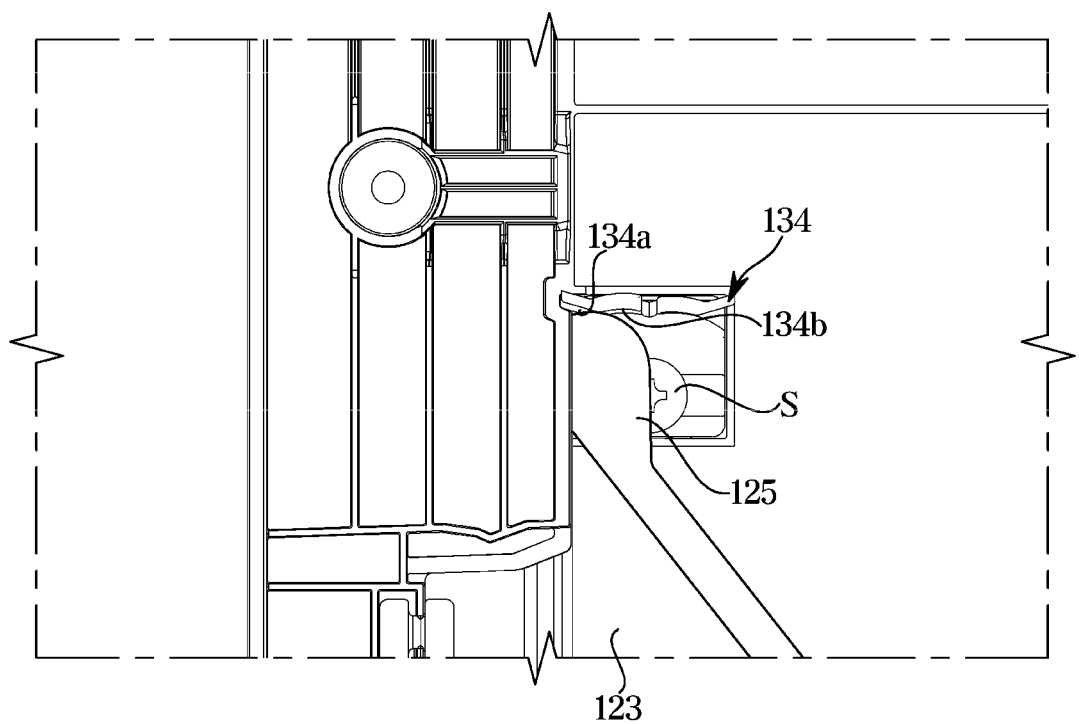
FIG. 7 is a view illustrating a process of closing the cover of the partition device in the refrigerator according to the embodiment of the disclosure, which shows a state in which a cover protrusion is elastically deformed by a cover fixer.
Figure 8:
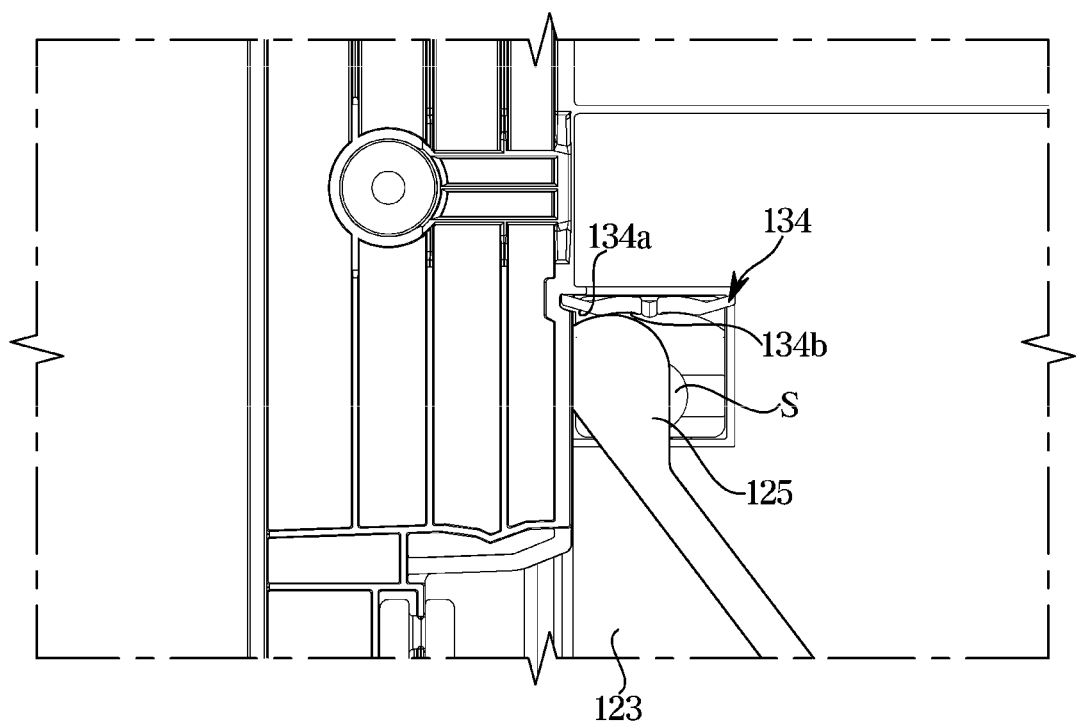
FIG. 8 is a view illustrating a process of closing the cover of the partition device in the refrigerator according to the embodiment of the disclosure, which shows a state after a cover protrusion is coupled to a cover fixer.

FIG. 5 is a view separately illustrating the partition device with a cover closed, in the refrigerator according to the embodiment of the disclosure. FIG. 6 is a view illustrating a process of closing the cover of the partition device in the refrigerator according to the embodiment of the disclosure, which shows a state before a cover protrusion is coupled to a cover fixer. FIG. 7 is a view illustrating a process of closing the cover of the partition device in the refrigerator according to the embodiment of the disclosure, which shows a state in which a cover protrusion is elastically deformed by a cover fixer. FIG. 8 is a view illustrating a process of closing the cover of the partition device in the refrigerator according to the embodiment of the disclosure, which shows a state after a cover protrusion is coupled to a cover fixer.

Hereinafter, a process of the cover 120 of the partition device 100 being closed and a structure for maintaining the cover in a closed state according to the embodiment of the disclosure will be described in detail with reference to FIGS. 5 to 8.

Referring to FIG. 5, the cover guide 130 may include the cover fixer 134 provided on a side surface of the cover guide 130. The cover fixer 134 may be coupled to the cover guide 130 by a fastening member S. Alternatively, the cover fixer 134 may be integrally formed with the cover guide 130.

As shown in FIG. 5, when the cover 120 is closed, a portion of the cover stopper 124 and a portion of the flange portion 123 may be inserted into the cover insertion groove 113.

The cover guide 130 may include the stopper support 133 provided to limit the opening angle of the cover 120 by making contact with the cover stopper 124, a buffer member 133a provided to alleviate an impact when the cover stopper 124 and the stopper support 133 are in contact with each other, and an accommodating portion 133b for accommodating the buffer member 133a, which will be described below.

The cover fixer 134 may be provided to be coupled to the cover protrusion 125 of the cover 120. The cover fixer 134 may be provided to be coupled to the cover protrusion 125 in a state in which the cover 120 closes the partition space 101, and the coupling of the cover protrusion 125 to the cover fixer 134 may allow the cover 120 to keep the partition space 101 closed.

The cover protrusion 125 may be elastically coupled to the cover fixer 134. The cover fixer 134 may be provided to be elastically deformed when the cover protrusion 125 is coupled to the cover fixer 134. Similarly, the cover fixer 134 may be provided to be elastically deformed when the cover protrusion 125 is separated from the cover fixer 134.

FIGS. 6 to 8 are views specifically illustrating a process of the cover protrusion 125 being elastically coupled to the cover fixer 134.

Referring to FIGS. 6 to 8, the cover fixer 134 may include a guide portion 134a and a seating portion 134b. The guide portion 134a and the seating portion 134b may be provided to be connected to each other. The guide portion 134a may be obliquely formed, and the seating portion 134b may be provided to correspond to the shape of the outer surface of the cover protrusion 125. For example, the seating portion 134b may be provided in an arc shape.

The guide portion 134a may guide the cover protrusion 125 such that the cover protrusion 125 is seated on the seating portion 134b. The guide portion 134a may be inclined such that when the cover protrusion 125 moves toward the seating portion 134b, the cover fixer 134 is elastically deformed by the cover protrusion 125 while moving upward. The guide portion 134a may be provided to be inclined downward in a direction in which the cover protrusion 125 moves toward the seating portion 134b.

The seating portion 134b may be provided in a shape corresponding to the shape of the outer surface of the cover protrusion 125. According to the embodiment of the disclosure, the outer surface of the cover protrusion 125 may be provided in an arc shape, and the seating portion 134b may also be provided in an arc shape. While the cover protrusion 125 is moving along the guide portion 134a, the cover fixer 134 may be elastically deformed and move upward. As the cover 120 further rotates, the cover protrusion 125 may be seated on the seating portion 134b. Upon the cover protrusion 125 being seated on the seating portion 134b, the cover fixer 134 may be moved to the original position by the elasticity or may be maintained in a position above the original position. In case the cover fixer 134 is maintained in a position above the original position, an elastic restoring force of the cover fixer 134 may be applied to the cover protrusion 125.

As described above, the shape of the outer surface of the cover protrusion 125 and the shape of the seating portion 134b correspond to each other, and thus the cover protrusion 125 may be stably seated on the seating portion 134b without an elastic restoring force of the cover fixer 134 applied to the cover protrusion 125. Once the cover protrusion 125 is seated on the seating portion 134b, the cover 120 may keep the partition space 101 closed. When the user pulls the cover 120 by applying a force greater than or equal to the elastic force exerted on the cover protrusion 125 from the cover fixer 134, the above process may be performed in a reverse manner so that the cover protrusion 125 may be separated from the cover fixer 134.

In the related art, a latch device is used to keep the cover closed, but the latch device has a relatively complicated structure and a high manufacturing cost. However, according to the aspect of the disclosure, the cover 120 may maintain the closed state with a simple structure of the cover fixer 134 and the cover protrusion 125 described above. Accordingly, the manufacturing cost of the refrigerator may be reduced and the productivity may be improved.

Figure 9:
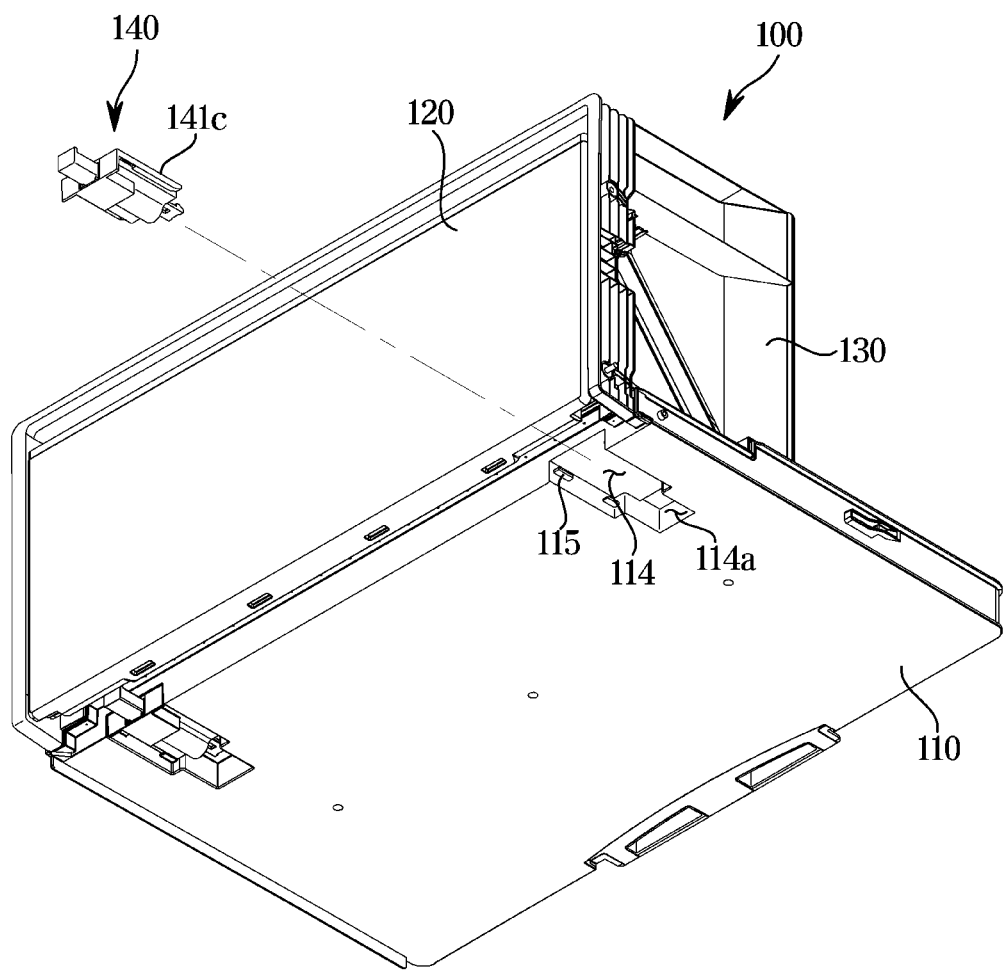
FIG. 9 is a view illustrating the partition device shown in FIG. 5, which is viewed at a different angle, with a damper separated from a partition.

FIG. 9 is a view illustrating the partition device shown in FIG. 5, which is viewed at a different angle, with a damper separated from a partition.

Referring to FIG. 9, the damper 140 may be slidably coupled to the lower surface of the partition 110 without a separate fastening member. A sliding support 141c provided to be supported by the support protrusion 115 may be provided on a side surface of a housing (141 in FIG. 10) of the damper 140. The damper 140 may be fixed to the damper groove 114 with the sliding support 141c being supported by the support protrusion 115. As the damper 140 slides into the damper groove 114, a housing protrusion (141b in FIG. 10) may be inserted into a protrusion locking groove 114a provided at a rear end of the damper groove 114. Once the housing protrusion 141b is inserted into the protrusion locking groove 114a, the damper 140 may not be withdrawn from the damper groove 114 even with a force applied to the damper 140 in a direction to withdraw from the damper groove 114. Accordingly, the damper 140 may not be separated from the damper groove 114. With such a process, the damper 140 may be coupled to the damper groove 114 only by a sliding operation without a separate fastening member.

Figure 10:
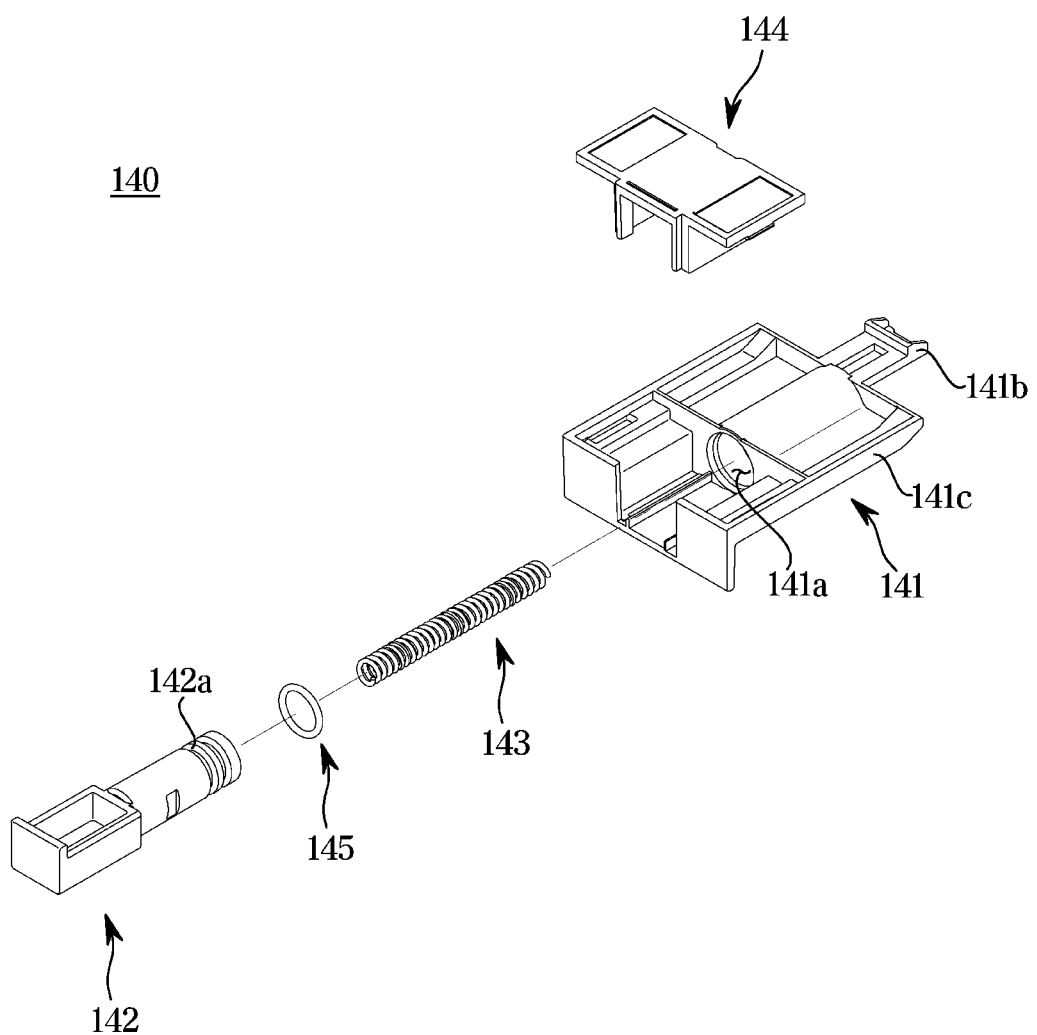
FIG. 10 is an exploded view illustrating the damper of the refrigerator according to the embodiment of the disclosure.

FIG. 10 is an exploded view illustrating the damper of the refrigerator according to the embodiment of the disclosure.

Referring to FIG. 10, the damper 140 may include the housing 141 provided to be inserted into the damper groove 114, and a damper cap 142 provided to be inserted into or withdrawn from the housing 141 by making contact with the cover 120, an elastic member 143 providing an elastic force to the damper cap 142, and a housing cover 144 provided to cover an open upper portion of the housing 141. In addition, the damper 140 may further include a friction ring 145 provided to increase a resistance force applied to the damper cap 142 when the damper cap 142 is inserted into the housing 141.

The housing 141 may be slidably coupled to the damper groove 114. The housing 141 may include an accommodating space 141a provided to accommodate a portion of the elastic member 143 and a portion of the damper cap 142. In addition, the housing 141 may include the housing protrusion 141b, which is inserted into the protrusion locking groove 114a to keep the housing 141 coupled to the damper groove 114, and the sliding support 141c, which is provided to be supported by the support protrusion 115. The inside of the accommodating space 141a may be provided to be sealed except for the entrance.

The damper cap 142 may be provided to come in contact with the cover 120 so as to be inserted into or withdrawn from the housing 141. The damper cap 142 may include a ring groove 142*a* to which the friction ring 145 is fitted. The ring groove 142*a* may be formed on the outer circumferential surface of the damper cap 142.

At least a portion of the elastic member 143 may be accommodated in the accommodating space 141*a*. The elastic member 143 may provide an elastic force to the damper cap 142. Specifically, the elastic member 143 may elastically bias the damper cap 142 for the damper cap 142 to be moved in a direction of being withdrawn from the housing 141. The elastic member 143 may include a compression spring.

The housing cover 144 may be coupled to the housing 141 to cover the open upper side of the housing 141. The housing cover 144 may prevent the damper 142 from moving upward.

The friction ring 145 may be coupled to the ring groove 142*a* of the damper cap 142. The friction ring 145 may be provided to come in contact with an inner wall of the housing 141 forming the accommodating space 141*a*, to increase a force required when the damper cap 142 is inserted into the housing 141.

Figure 11:
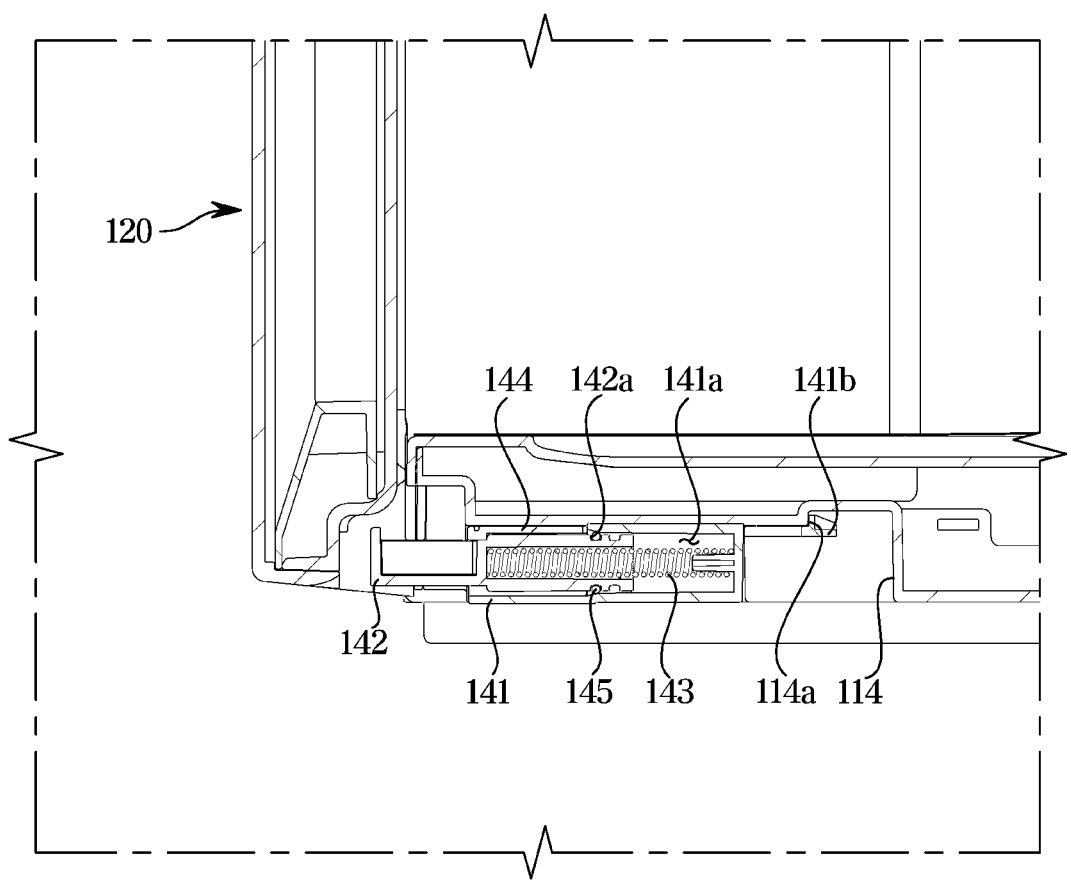
FIG. 11 is a side cross-sectional view illustrating a part of the partition device with the cover closed in the refrigerator according to the embodiment of the disclosure.
Figure 12:
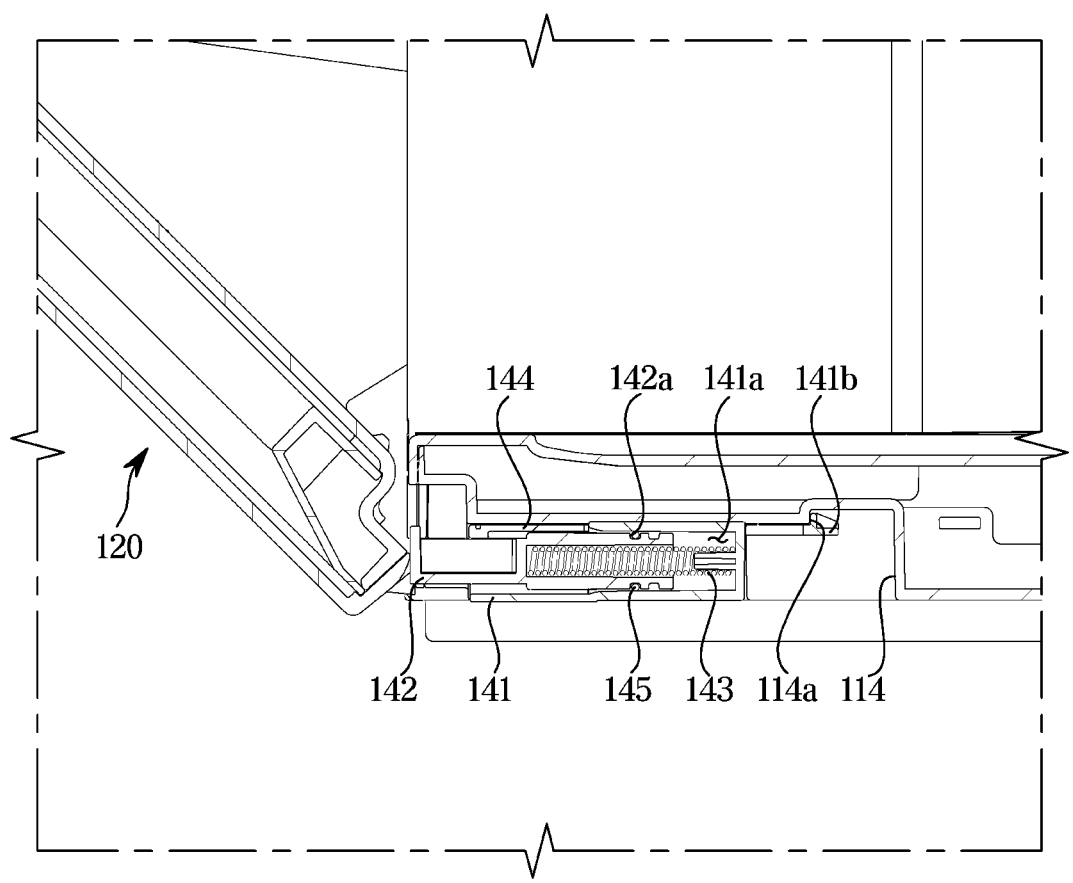
FIG. 12 is a side cross-sectional view illustrating a part of the partition device during opening of the cover in the refrigerator according to the embodiment of the disclosure.
Figure 13:
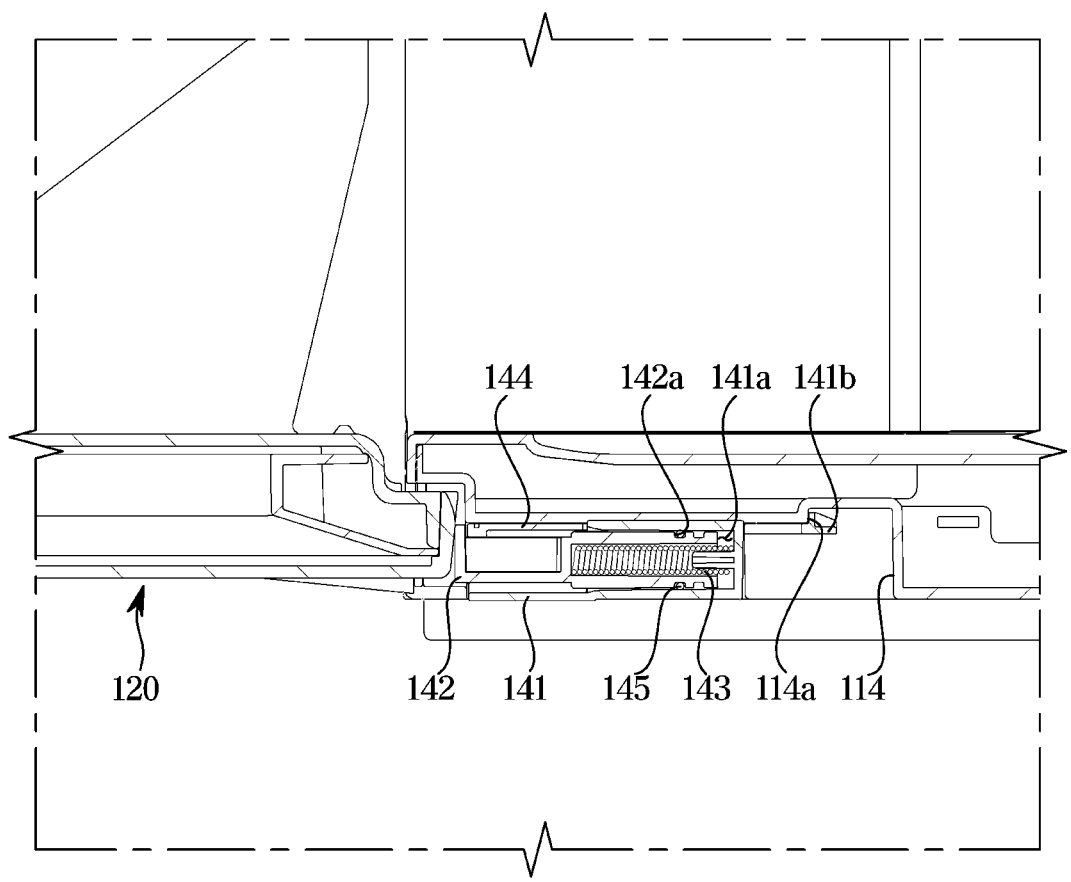
FIG. 13 is a side cross-sectional view illustrating a part of the partition device with the cover open in the refrigerator according to the embodiment of the disclosure.

FIG. 11 is a side cross-sectional view illustrating a part of the partition device with the cover closed in the refrigerator according to the embodiment of the disclosure. FIG. 12 is a side cross-sectional view illustrating a part of the partition device during opening of the cover in the refrigerator according to the embodiment of the disclosure. FIG. 13 is a side cross-sectional view illustrating a part of the partition device with the cover open in the refrigerator according to the embodiment of the disclosure.

Referring to FIGS. 11 to 13, in a process of the cover 120 being opened, at least a portion of the cover 120 may come in contact with the front surface of the damper cap 142. The cover 120 in contact with the damper cap 142 may apply a force to the damper cap 142 such that the damper cap 142 is inserted into the housing 141.

The damper 140 may be provided to reduce the opening speed of the cover 120. As the damper cap 142 is inserted into the housing 141 at a slow speed, the opening speed of the cover 120 may be reduced.

According to the aspect of the disclosure, while the damper cap 142 is being inserted into the housing 141, the following three resistive forces may be applied to the damper cap 142.

First, an elastic force of the elastic member 143 is applied in a direction in which the damper cap 142 is withdrawn from the housing 141.

Second, while the damper cap 142 is being inserted into the accommodating space 141*a*, a compression force of air compressed by the damper cap 142 in the sealed accommodating space 141*a* exerts.

Third, a frictional force generated when the friction ring 145 comes into contact with the inner wall of the housing 141 forming the accommodating space 141*a* exerts.

According to the aspect of the disclosure, when the cover 120 applies a force greater than or equal to the summation of the elastic force, the compression force of air, and the frictional force of the friction ring 145 to the damper cap 142, the damper cap 142 may be inserted into the housing 141 and the cover 120 may become open. Because the compression force of air and the frictional force of the friction ring 145 are added, the opening speed of the cover 120 may be further reduced when compared to the opening speed of the cover 120 being reduced only by the elastic force of the elastic member 143. Accordingly, the cover 120 may be opened slowly and gently. As the cover 120 is slowly and gently opened, the user may feel a sense of luxury, and the user's satisfaction may be improved.

Figure 14:
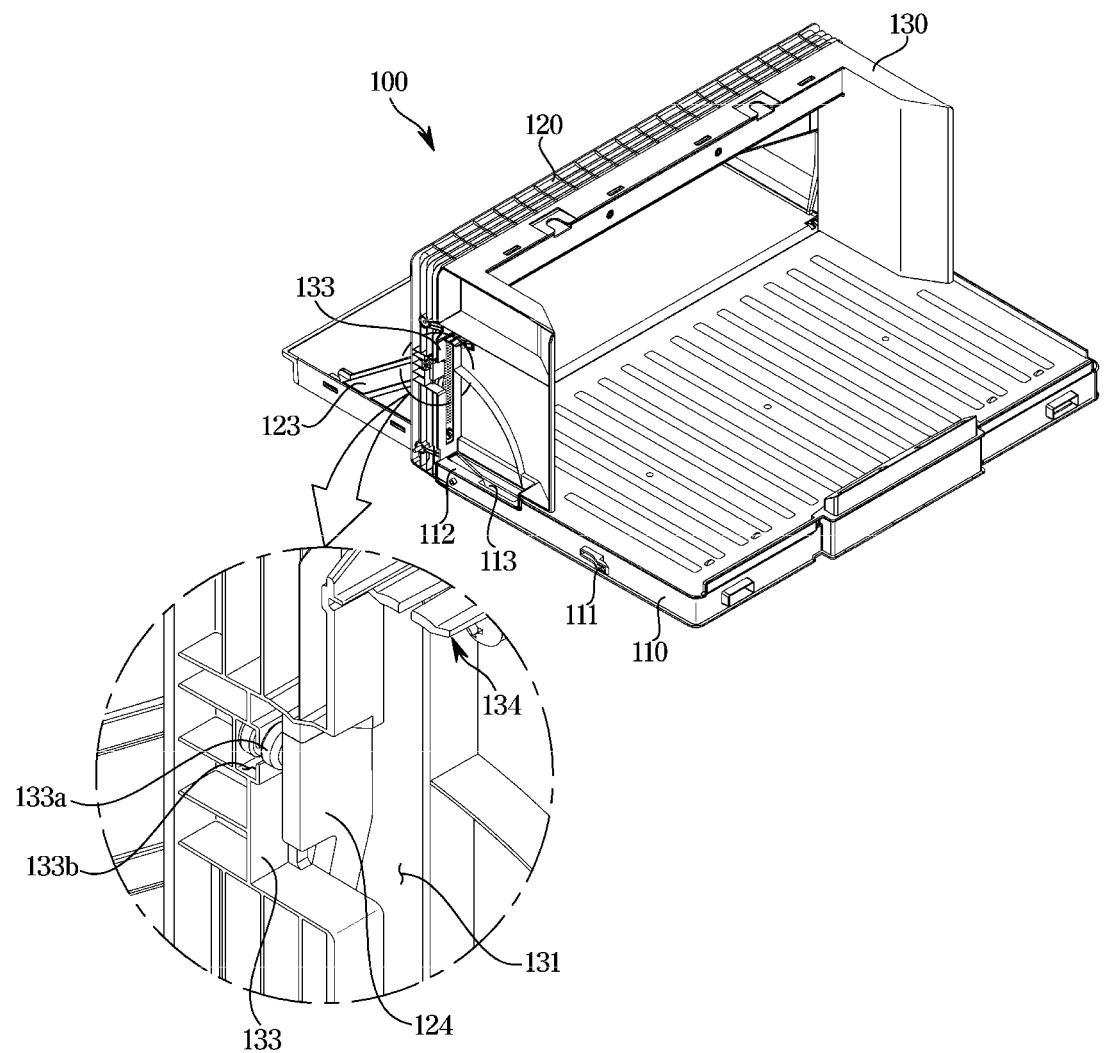
FIG. 14 is a view separately illustrating the partition device in the refrigerator according to the embodiment of the disclosure, which shows a state in which the cover is open.

FIG. 14 is a view separately illustrating the partition device in the refrigerator according to the embodiment of the disclosure, which shows a state in which the cover is open.

The structure of the partition device 100 with the cover 120 open will be described in detail with reference to FIG. 14.

As described above, the cover stopper 124 may be provided not to pass through the guide hole 131. As the guide hole 131 guides the movement of the flange portion 123, the cover guide 130 may guide the movement of the cover 120. Specifically, as the cover 120 moves, the flange portion 123 may pass through the guide hole 131 and move. That is, the flange portion 123 may pass through the guide hole 131. The width of the cover stopper 124 may be greater than the width of the guide hole 131 so that the cover stopper 124 is prevented from passing through the guide hole 131. Because the cover stopper 124 does not pass through the guide hole 131, the cover 120 may no longer be opened. That is, the opening angle or movement range of the cover 120 may be limited.

The cover stopper 124 may be not prevented from passing through the guide hole 131 by being caught with the stopper support 133. The stopper support 133 may further include a buffer member 133*a* and an accommodating portion 133*b* in which the buffer member 133*a* is accommodated. The buffer member 133*a* may be formed of a flexible material to absorb shock, for example, a silicon material. The buffer member 133*a* may be provided to be in contact with the cover stopper 124. Without the buffer member 133*a*, the cover stopper 124 may come in contact with the stopper support 133, but with the buffer member 133*a*, the cover stopper 124 may come in contact with the buffer member 133*a*. Because the buffer member 133*a* is provided to absorb a shock, a shock generated during a contact with the cover stopper 124 may be reduced. That is, the cover 120 may be gently opened.

According to the aspect of the disclosure, the stopper support 133 may be arranged perpendicular to the partition 110. With such an arrangement, the stopper support 133 may be arranged to be spaced apart from the shaft protrusion 132 in the upper side and lower side direction. In addition, in a state in which the cover 120 opens the partition space 101, the shaft coupling portion 132 and the cover stopper 124 may be arranged to be spaced apart from each other in the upper side and lower side direction.

When the cover 120 becomes open, a portion of the cover 120 that is the most vulnerable to a load is the shaft coupling portion 122 serving as the rotation axis of the cover 120. As the distance between the shaft coupling portion 122 serving as the rotation axis of the cover 120 and the cover stopper 124 withstanding the reaction force against to a load applied to the cover 120 increases, the stress applied to the shaft coupling portion 122 decreases. That is, as the distance between the shaft coupling portion 122 and the cover stopper 124 increases, the stress applied to the shaft coupling portion 122 is reduced. According to the aspect of the disclosure, in order to increase the distance between the shaft coupling portion 122 and the cover stopper 124, the shaft protrusion 132 and the stopper support portion 133 may be arranged to be spaced apart from each other in the upper side and lower side direction. Similarly, when the cover 120 becomes open, the shaft coupling portion 122 and the cover stopper 124 may be arranged to be spaced apart from each other in the upper side and lower side direction.

In the related art, the distance between the rotation shaft of the cover and the support of the cover that withstands the reaction force against the load is relatively short. This is because the support withstands the reaction force against the load by making contact with the lower surface of the partition. As to describe the related art using the terms of the disclosure, the stopper support is provided on the partition, which causes the shaft protrusion and the stopper support to be arranged apart from each other in the left side and right side direction. With such a structure, the distance between the shaft protrusion and the stopper support is relatively short.

In order to reinforce the rotation shaft portion of the cover and the support of the cover that withstands the reaction force against the load in the related art, reinforcing materials are added to the rotation shaft portion and the support. Adding reinforcing materials may increase the material cost and decrease productivity.

According to the aspect of the disclosure, rather than adding a reinforcing material to the rotation shaft portion and the support of the cover, a cover capable of withstanding the load applied to the cover may be provided. As described above, when the distance between the shaft coupling portion 122 and the cover stopper 124 increases, the stress applied to the shaft coupling portion 122 is reduced. According to the aspect of the disclosure, the stopper support 133, which is provided to support the cover stopper 124 while in contact with the cover stopper 124, may be spaced apart from the partition 110 in the upper side and lower side direction rather than being provided on the partition 110. In addition, a contact surface of the stopper support 133 provided to come in contact with the cover stopper 124 may be arranged perpendicular to the upper surface of the partition 110. As the stopper support part 133 corresponding to the cover stopper 124 and the shaft protrusion 132 corresponding to the shaft coupling portion 122 are spaced apart from each other in the upper side and lower side direction, the shaft coupling portion 122 and the cover stopper 124 may be spaced apart from each other in the upper side and lower side direction. As the shaft coupling portion 122 and the cover stopper 124 are arranged to be spaced apart from each other in the upper side and lower side direction, the distance between the shaft coupling portion 122 and the cover stopper 124 may be larger than with the related art in which the shaft coupling portion and the cover stopper are arranged to be spaced apart from each other in the left side and right side direction. Accordingly, a stress applied to the shaft coupling portion 122 may be reduced, and deformation or damage of the shaft coupling portion 122 may be prevented without adding a reinforcing material.

As is apparent from the above, according to the aspect the disclosure, a refrigerator including a partition space inside a storage chamber with an internal temperature different from an internal temperature of the storage chamber can be provided.

According to the aspect the disclosure, a refrigerator provided with reduced material costs and improved productivity by forming a partition space inside a storage chamber in a simple structure can be provided.

According to the aspect the disclosure, a refrigerator with improved user convenience and structural stability of a door for opening and closing a partition space inside a storage chamber by reducing the opening speed of the door when opening the door can be provided.

Although the disclosure has been shown and described in relation to specific embodiments, it would be appreciated by those skilled in the art that changes and modifications may be made in these embodiments without departing from the principles and scope of the disclosure, the scope of which is defined in the claims and their equivalents.

What is claimed is:

1. A refrigerator comprising:
   an outer case to form an external appearance of the refrigerator;
   an inner case arranged at an interior of the outer case to form a storage chamber having an opening, the inner case having a coupling hole;
   a door to open or close the opening of the storage chamber;
   a partition having:
      a coupling protrusion to be inserted into the coupling hole to couple the partition to the inner case to partition the storage chamber to form a partition space within the storage chamber, the partition space has an opening;
      a cover to open or close the opening of the partition space so that while the door is opened to open the storage chamber, the partition space is accessible by opening the cover; and
      a damper mountable on the partition, and configured to reduce an opening speed of the cover while mounted on the partition; and
   a cover guide which the cover is rotatably couplable to the cover guide, to guide a movement of the cover and limit a movement range of the cover, and having a coupling rib,
   wherein the partition further includes a rib insertion groove into which the coupling rib of the cover guide is to be inserted and supported by the partition, the rib insertion groove formed by recessing from a portion of the partition.

2. The refrigerator of claim 1, wherein:
   a lower side of the partition space is formed by an upper portion of the partition; and
   an upper side of the partition space, a rear side of the partition space, and opposite sides of the partition space formed by the inner case.

3. The refrigerator of claim 1, wherein the partition space is configured to have an internal temperature lower than an internal temperature of the storage chamber while the refrigerator is powered on.

4. The refrigerator of claim 1, wherein the partition includes:
   a damper groove at a lower surface of the partition so that that the damper is insertable into the damper groove; and
   a support protrusion formed to protrude from the damper groove and support the damper so that the damper is fixed to the damper groove.

5. The refrigerator of claim 4, wherein the damper includes:
   a housing to be supported by the support protrusion and to be fixed to the damper groove;
   a damper cap to be in contact with the cover, and to be withdrawable from and insertable into the housing; and
   an elastic member arranged inside the housing and providing the damper cap with an elastic force as the damper cap is being withdrawn from the housing.

6. The refrigerator of claim 5, wherein the damper further includes a friction ring couplable to a ring groove formed on an outer circumferential surface of the damper cap, and
   in response to inserting the damper cap into the housing, a force for the damper cap to be inserted into the housing is increased by a friction force between the friction ring and the housing.

7. The refrigerator of claim 5, wherein the housing includes an accommodating space to accommodate at least a portion of the damper cap, and in response to inserting the damper cap is into the housing, a force for the damper cap to be inserted into the housing is increased by air in the accommodating space being compressed by the damper cap.

8. The refrigerator of claim 1, wherein the cover guide includes:

a guide hole to guide the movement of the cover in response to rotating the cover to open or close the partition space; and a shaft protrusion to form a rotation axis of the cover.

9. The refrigerator of claim 8, wherein the cover includes:

a plate to cover the opening of the partition space in response to closing the partition space by the cover;

a shaft coupling portion to which the shaft protrusion is rotatably coupled; and a flange portion to pass through the guide hole according to a rotation of the cover, the flange portion protruding rearward from the plate.

10. The refrigerator of claim 9, wherein the cover further includes a cover stopper disposed on the flange portion to be caught with the guide hole to limit an opening angle of the cover.

11. The refrigerator of claim 10, wherein the cover guide further includes a stopper support to support the cover by contacting with the cover stopper in response to opening the partition space by the cover, and the stopper support is arranged perpendicular to the partition.

12. The refrigerator of claim 10, wherein the shaft coupling portion and the cover stopper are spaced apart in an upper side direction and a lower side direction in response to opening the partition space by the cover.

13. The refrigerator of claim 10, wherein the partition further comprises a cover insertion groove into which a portion of the cover stopper and a portion of the flange portion of the cover are inserted, the cover insertion groove formed by recessing a portion of the rib insertion groove.

14. The refrigerator of claim 8, wherein the cover guide further includes a cover fixer configured to fix the cover to the cover guide to support the partition space to be remained closed by the cover, wherein the cover further includes a cover protrusion elastically coupled to the cover fixer so that the cover is fixed to the cover guide.

15. The refrigerator of claim 14, wherein the cover fixer is on a surface of the cover guide that faces a side surface of the inner case, and the cover protrusion is couplable to the cover fixer by passing through the guide hole.

* * * * *

UNITED STATES PATENT AND TRADEMARK OFFICE
CERTIFICATE OF CORRECTION

PATENT NO. : 12,270,596 B2
APPLICATION NO. : 17/825029
DATED : April 8, 2025
INVENTOR(S) : Seyeun Chang et al.

It is certified that error appears in the above-identified patent and that said Letters Patent is hereby corrected as shown below:

In the Claims

Column 14, Line 46:
In Claim 4, after "so" delete "that".

Signed and Sealed this
First Day of July, 2025

Coke Morgan Stewart
*Acting Director of the United States Patent and Trademark Office*